(12) United States Patent
Matsumoto et al.

(10) Patent No.: US 8,227,102 B2
(45) Date of Patent: Jul. 24, 2012

(54) BATTERY TRAY, ELECTRONIC APPARATUS, AND VERTICAL GRIP DEVICE

(75) Inventors: Yukari Matsumoto, Tokyo (JP); Yoshio Kajino, Kanagawa (JP); Shinjiro Komatani, Tokyo (JP); Michihiro Iwata, Osaka (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 12/219,567

(22) Filed: Jul. 24, 2008

(65) Prior Publication Data

US 2009/0061295 A1    Mar. 5, 2009

(30) Foreign Application Priority Data

Sep. 4, 2007 (JP) ................ 2007-228558

(51) Int. Cl.
*H01M 2/10* (2006.01)
(52) U.S. Cl. ............................... 429/99; 429/100
(58) Field of Classification Search .............. 429/96, 429/97, 99, 100; 220/521, 523, 527–529; 361/679.01, 823, 829
See application file for complete search history.

(56) References Cited

U.S. PATENT DOCUMENTS

| 6,677,078 B2 * | 1/2004 | Reise et al. ................ 429/159 |
| 2008/0268296 A1 * | 10/2008 | Larsen ...................... 429/1 |

FOREIGN PATENT DOCUMENTS

| JP | 07-098472 A | 4/1995 |
| JP | 07-122250 A | 5/1995 |
| JP | 08-053095 A | 2/1996 |
| JP | 08-114829 A | 5/1996 |
| JP | 08-273644 A | 10/1996 |
| JP | 11-202391 | 7/1999 |
| JP | 2000-023009 A | 1/2000 |
| JP | 2001-075157 A | 3/2001 |
| JP | 2001-352477 A | 12/2001 |
| JP | 2002-042759 A | 2/2002 |
| JP | 2002-082379 A | 3/2002 |
| JP | 2003-109559 A | 4/2003 |
| JP | 2003-197171 A | 7/2003 |
| JP | 2005-071911 A | 3/2005 |
| JP | 2005-317281 A | 11/2005 |
| JP | 2006-003501 A | 1/2006 |
| JP | 2006-030404 A | 2/2006 |
| JP | 2007-060720 A | 3/2007 |

OTHER PUBLICATIONS

Japanese Office Action issued Oct. 20, 2009 for corresponding Japanese Application No. 2007-228558.
Japanese Office Action issued Jul. 7, 2009 for corresponding Japanese Application No. 2007-228558.

* cited by examiner

*Primary Examiner* — Ula C. Ruddock
*Assistant Examiner* — Thomas H. Parsons
(74) *Attorney, Agent, or Firm* — Rader Fishman & Grauer, PLLC

(57) ABSTRACT

A battery tray in which two batteries each having a thin and long shape are accommodated includes two thin and long shaped battery accommodation spaces in which the two batteries are accommodated in a state where the batteries are arranged such that the longitudinal direction of the batteries extends on the same straight line.

10 Claims, 14 Drawing Sheets

BATTERY TRAY, ELECTRONIC APPARATUS, AND VERTICAL GRIP DEVICE

CROSS REFERENCES TO RELATED APPLICATIONS

The present invention contains subject matter related to Japanese Patent Application JP 2007-228558 filed in the Japanese Patent Office on Sep. 4, 2007, the entire contents of which being incorporated herein by reference.

BACKGROUND OF THE INVENTION

1. Field of the Invention

The present invention relates to a battery tray, an electronic apparatus, and a vertical grip device.

2. Description of the Related Art

In taking a photograph with an imaging apparatus, such as a digital still camera, so-called photographing at the lateral position, which is photographing in a condition where both sides of a housing of the imaging apparatus in the longitudinal direction thereof are held by left and right hands and the left and right hands are positioned in left and right sides to hold the housing in a state where the longitudinal direction of the housing is a horizontal direction, is performed in many cases. For this reason, operation switches related to photographing, such as a shutter switch, are also disposed on the housing so as to be easily operated at the time of photographing at the lateral position.

On the other hand, in the case of taking a photograph in a state where the housing is rotated by 90° with respect to the lateral position with an optical axis of a photographing optical system of the imaging apparatus as the center, that is, in the case of performing so-called photographing at the vertical position, the hands which hold both the ends of the housing in the longitudinal direction thereof are positioned at upper and lower sides, which causes inconvenience that a shooting posture becomes unnatural.

For this reason, there is provided a vertical grip device which is detachably mounted in a lower portion of the housing so that the left and right hands can hold the housing in a state, in which the left and right hands are positioned at the left and right sides in the same manner as photographing at the lateral position, even in the case when the imaging apparatus performs imaging at the vertical position (refer to JP-A-11-202391).

This kind of vertical grip device has a thin and long shaped housing, has a battery chamber in which two batteries are accommodated and which is provided in a lower portion of the housing in a condition where the longitudinal direction of the housing is made to be parallel to the width direction of the imaging apparatus, and has a function of supplying the electric power of the two batteries accommodated in the battery chamber to the imaging apparatus, in many cases.

In a known vertical grip device, the battery chamber is provided to accommodate two batteries therein such that the two batteries are arranged in the left and right direction of the housing in a state where the longitudinal direction of each of the two batteries is the front and rear direction of the housing.

SUMMARY OF THE INVENTION

Therefore, in the known vertical grip device, a space occupied in the front and rear direction of the housing of the vertical grip device becomes large. As a result, since it was difficult to make the vertical grip device compact, there were disadvantages in terms of the operability at the time of photographing of the vertical grip device, the portability, and easiness in placing the vertical grip device.

In view of the above, it is desirable to provide a battery tray, an electronic apparatus, and a vertical grip device capable of improving the operability or the portability of the electronic apparatus and allowing the electronic apparatus easily placed while making an electronic apparatus, such as a vertical grip device, compact.

According to an embodiment of the present invention, a battery tray in which two batteries each having a thin and long shape are accommodated includes two thin and long shaped battery accommodation spaces in which the two batteries are accommodated in a state where the batteries are arranged such that the longitudinal direction of the batteries extends on the same straight line.

Furthermore, according to another embodiment of the present invention, an electronic apparatus includes a housing having a battery chamber to which a battery is detachably attached together with a battery tray. The battery tray has a thin and long shape in which two batteries each having a thin and long shape are accommodated in a state where the batteries are arranged such that the longitudinal direction of the batteries extends on the same straight line. The housing has a thin and long shape. The battery chamber has a thin and long shape along the longitudinal direction of the housing and one end of the battery chamber in the longitudinal direction thereof is opened to the housing through an opening. The battery tray is provided to be detachably attached through the opening along the longitudinal direction of the battery tray, and a lid which opens and closes the opening is provided.

Furthermore, according to still another embodiment of the present invention, a vertical grip device engaged with or disengaged from a lower portion of an imaging apparatus includes: a housing that has a grip portion extending in the left and right direction and has a thin and long shape in the left and right direction; and a battery chamber which is provided in the housing and to which a battery is detachably attached together with a battery tray. The battery tray has a thin and long shape in which two batteries each having a thin and long shape are accommodated in a state where the batteries are arranged such that the longitudinal direction of the batteries extends on the same straight line. The battery chamber has a thin and long shape along the longitudinal direction of the housing and one end of the battery chamber in the longitudinal direction thereof is opened to the housing through an opening. The battery tray is provided to be detachably attached through the opening along the longitudinal direction of the battery tray, and a lid which opens and closes the opening is provided.

Furthermore, according to still another embodiment of the present invention, an electronic apparatus includes a housing provided with a battery chamber. The battery chamber has a thin and long shape in which two batteries each having a thin and long shape are accommodated in a state where the batteries are arranged such that the longitudinal direction of the batteries extends on the same straight line. An end of the battery chamber in the longitudinal direction thereof is opened through an opening provided in the housing, and a lid which opens and closes the opening is provided.

Furthermore, according to still another embodiment of the present invention, a vertical grip device engaged with or disengaged from a lower portion of an imaging apparatus includes: a housing that has a grip portion extending in the left and right direction and has a thin and long shape in the left and right direction; and a battery chamber provided in the housing. The battery chamber has a thin and long shape with a width extending along the front and rear direction of the housing, a height which is larger than the width and extends along the up and down direction of the housing, and a depth which is larger than the height and extends along the left and right direction of the housing. An end of the battery chamber in the longitudinal direction thereof is opened through an opening provided in the housing, and a lid which opens and closes the opening is provided.

According to the embodiments the present invention, it is possible to make an electronic apparatus, such as a vertical grip device, compact and therefore, to improve the operability or the portability and easiness in placing the electronic apparatus.

DESCRIPTION OF THE PREFERRED EMBODIMENTS

Hereinafter, an embodiment of the present invention will be described with reference to the accompanying drawings.

In the present embodiment, a case where an electronic apparatus is a vertical grip device which is detachably attached to an imaging apparatus will be described.

Figure 1:
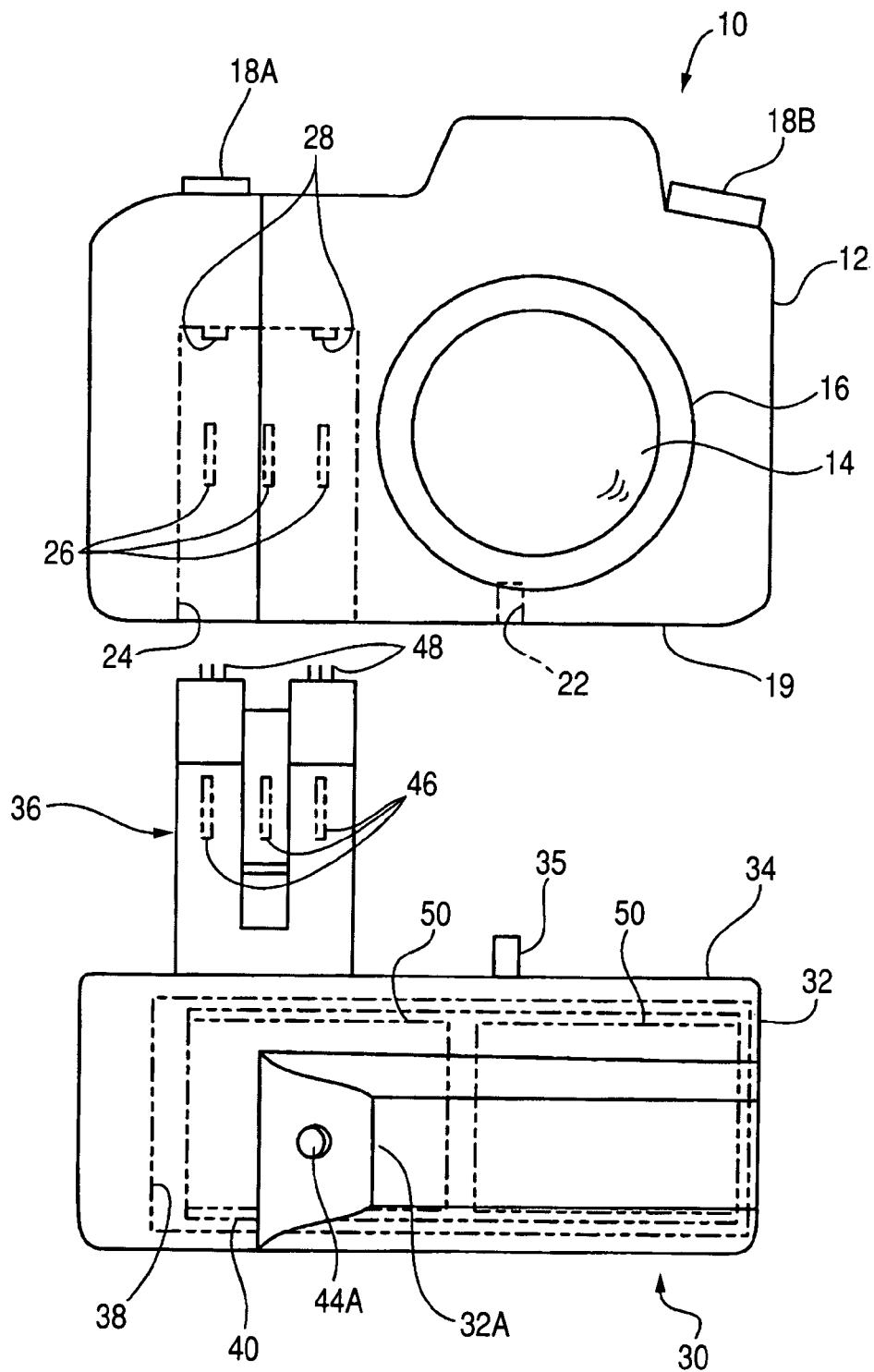
FIG. 1 is a front view illustrating an imaging apparatus and a vertical grip device.
Figure 2:
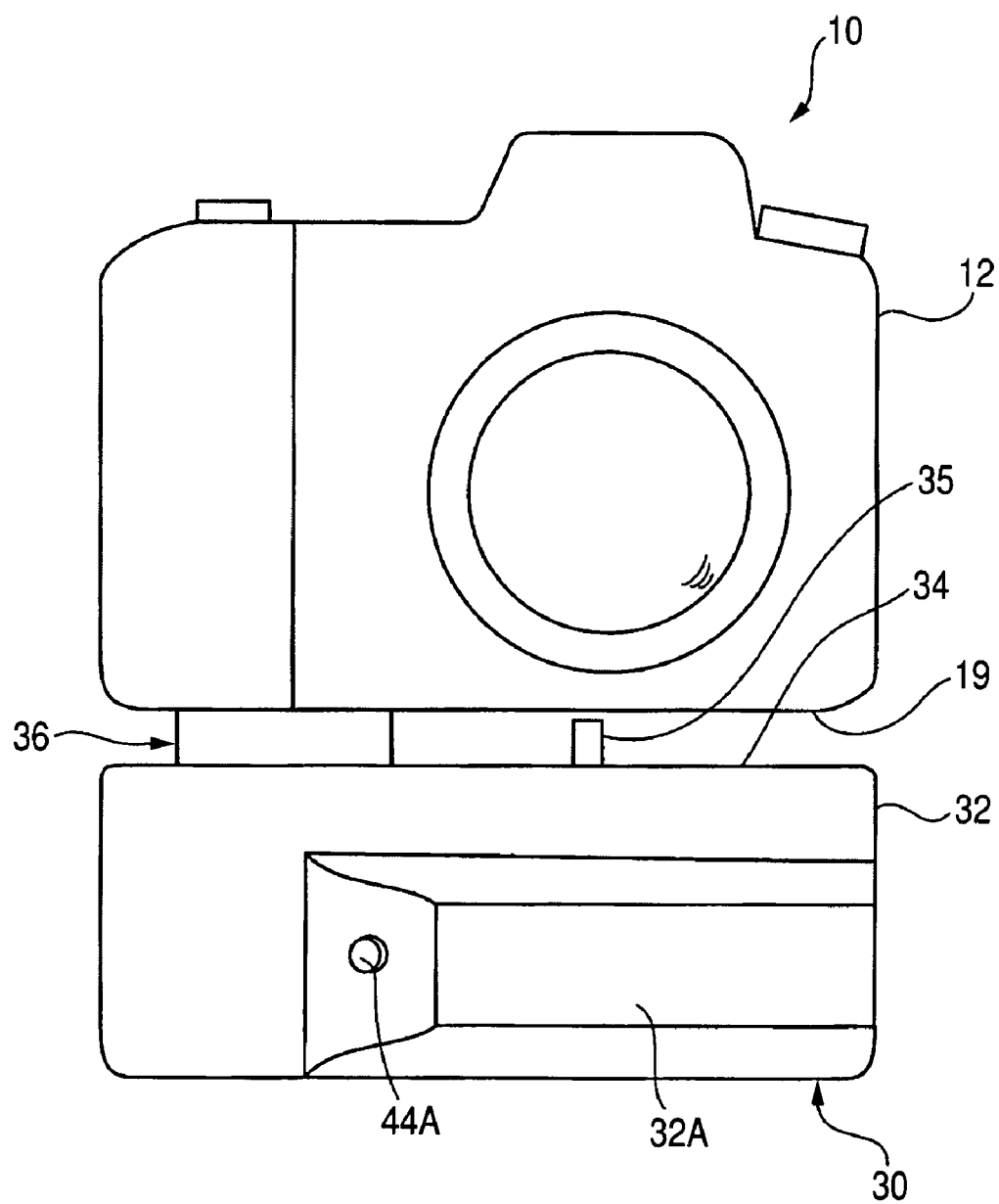
FIG. 2 is a front view illustrating a process in which the vertical grip device is attached to the imaging apparatus.
Figure 3:
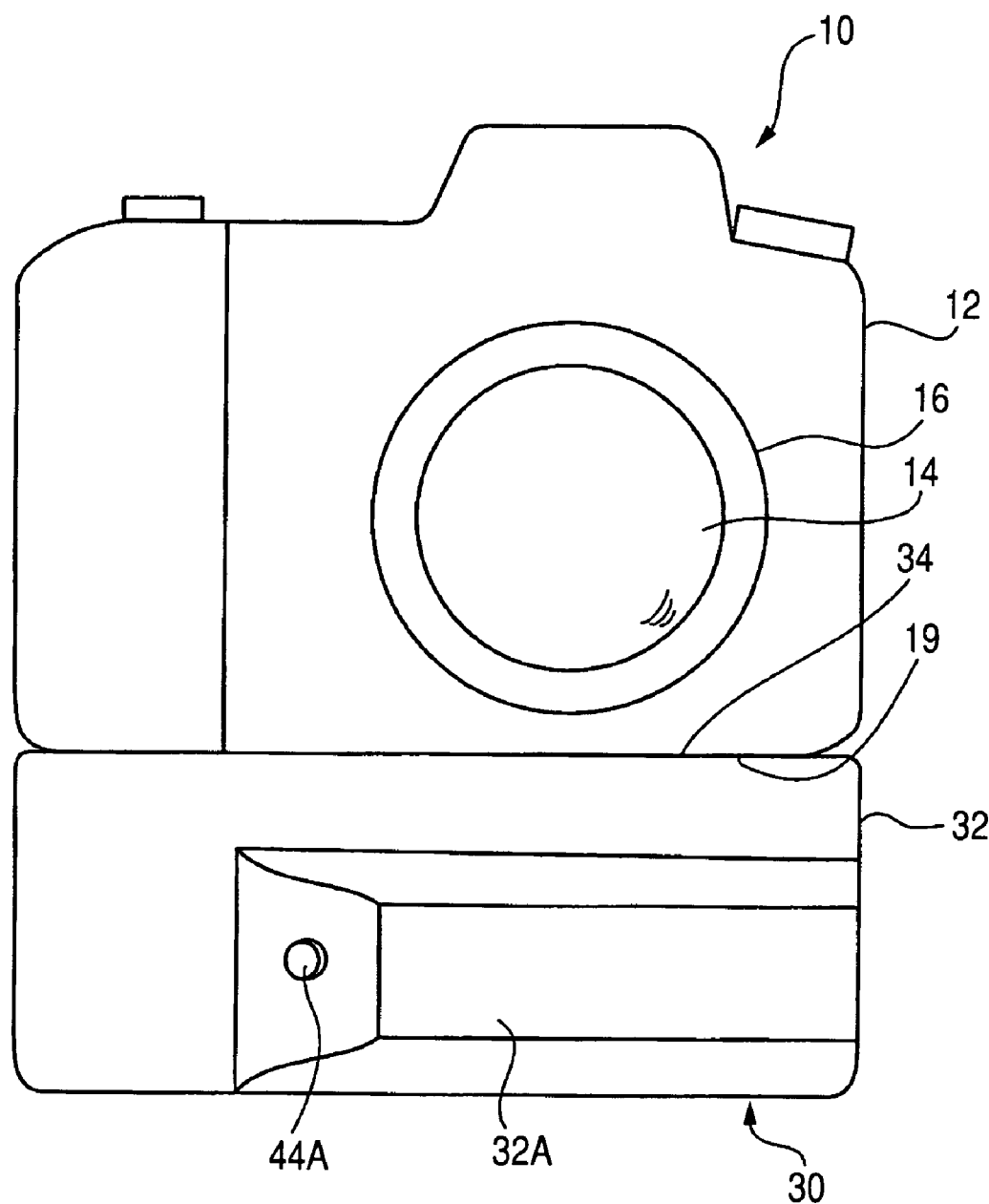
FIG. 3 is a front view illustrating a state where the vertical grip device is attached to the imaging apparatus.
Figure 4:
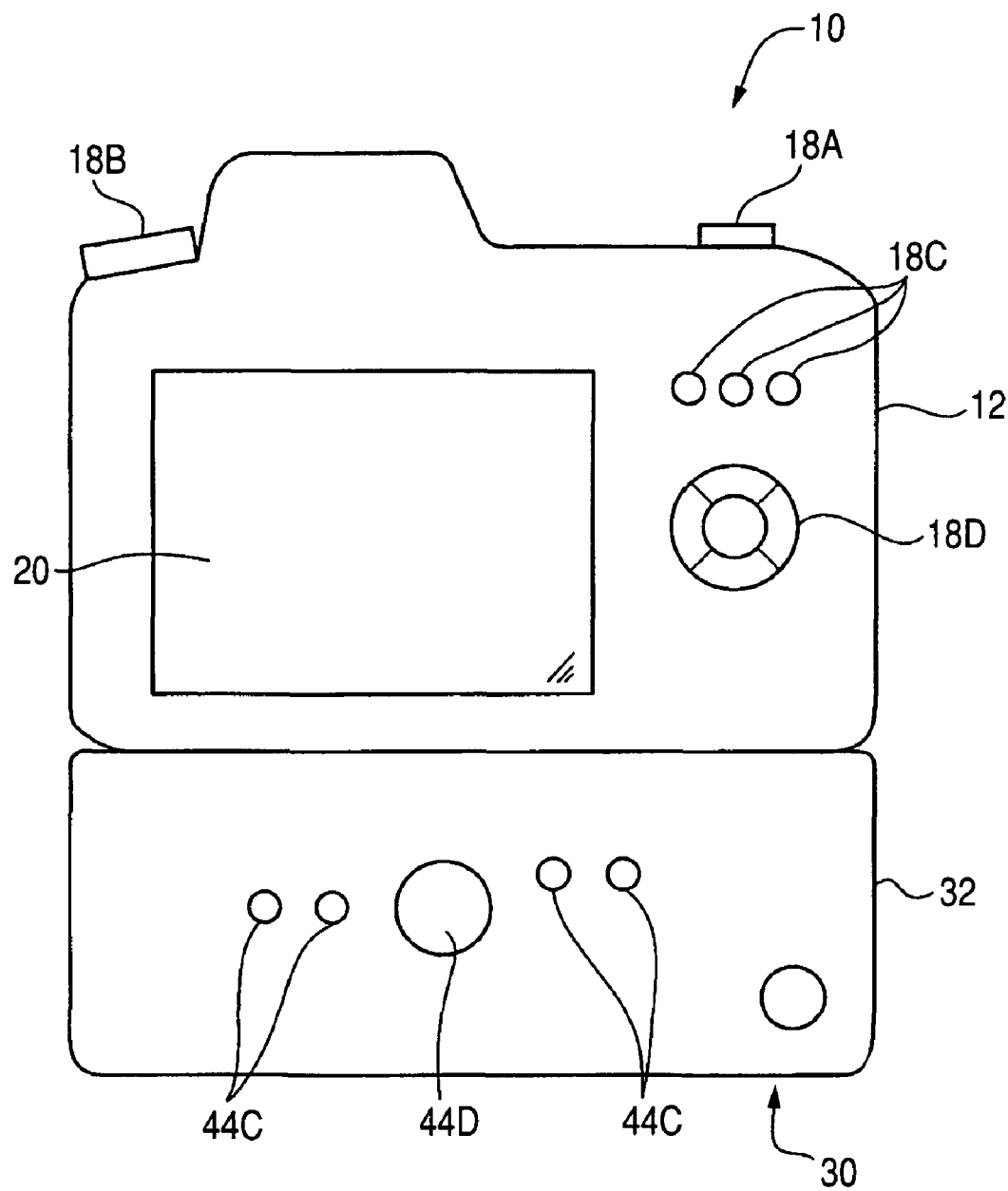
FIG. 4 is a back surface view illustrating a state where the vertical grip device is attached to the imaging apparatus.

FIG. 1 is a front view illustrating an imaging apparatus 10 and a vertical grip device 30. FIG. 2 is a front view illustrating a process in which the vertical grip device 30 is attached to the imaging apparatus 10. FIG. 3 is a front view illustrating a state where the vertical grip device 30 is attached to the imaging apparatus 10. FIG. 4 is a back surface view illustrating a state where the vertical grip device 30 is attached to the imaging apparatus 10.

Figure 13:
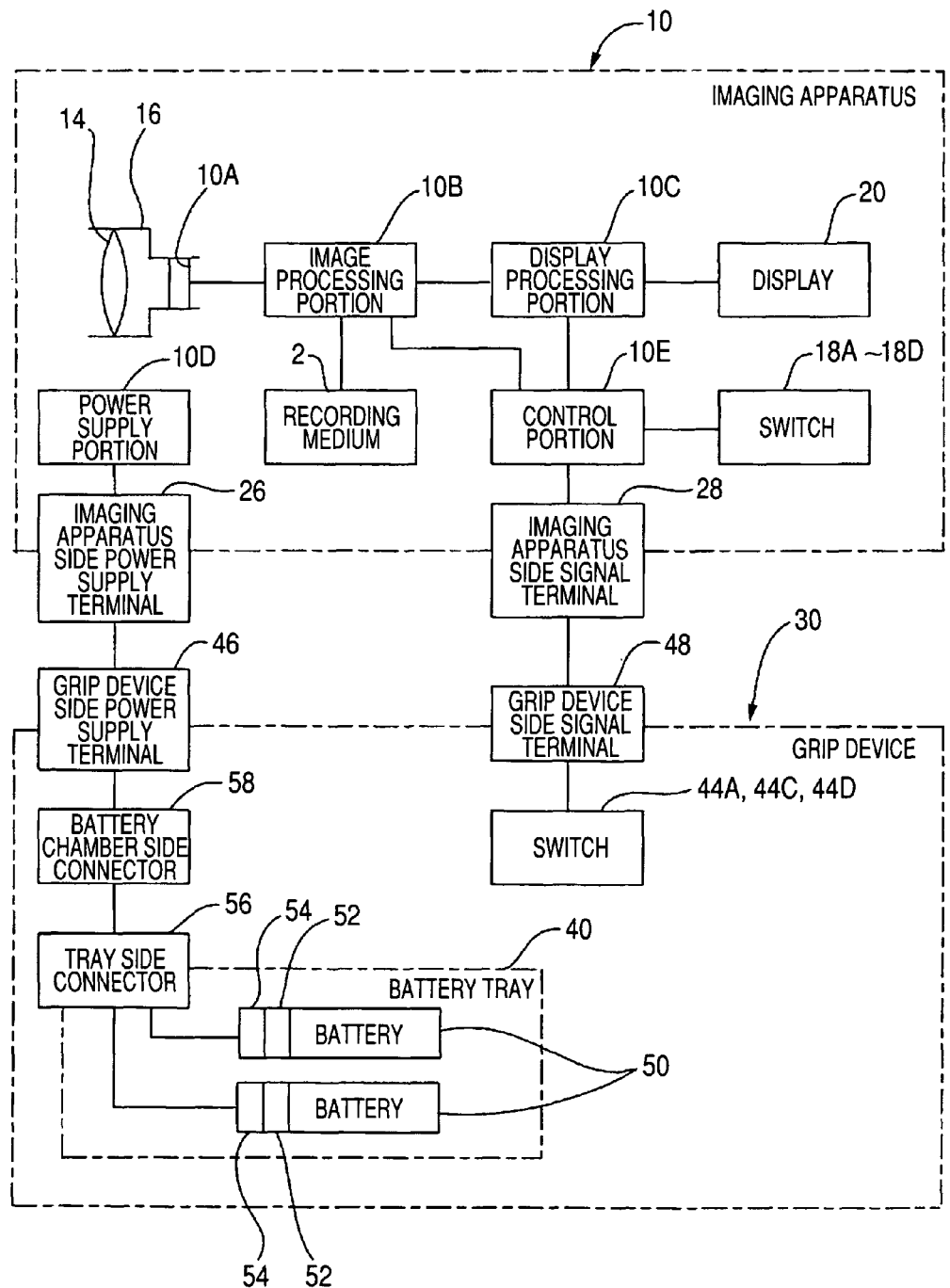
FIG. 13 is a block diagram illustrating a control system of an imaging apparatus and a vertical grip device.

In addition, FIG. 13 is a block diagram illustrating a control system of the imaging apparatus 10 and the vertical grip device 30.

As shown in FIGS. 3 and 4, the vertical grip device 30 is attached to the imaging apparatus 10 to function as a vertical grip device that is gripped by hand when imaging in a vertical position is performed by the imaging apparatus 10. That is, by positioning the imaging apparatus 10 to which the vertical grip device 30 is attached in the vertical position and gripping a grip portion 32A of the vertical grip device 30 with a right hand, it is possible to operate a shutter switch 44A of the vertical grip device 30 with a finger of the right hand and to easily operate an operation switch 44C and a control switch 44D of the vertical grip device 30 in a state where the imaging apparatus 10 is positioned in the vertical direction.

In addition, as shown in FIG. 1, two batteries 50 are accommodated in the vertical grip device 30 and the vertical grip device 30 is attached to the imaging apparatus 10, such that the vertical grip device 30 also functions as a power supply device which supplies electric power of the two batteries 50 to the imaging apparatus 10. That is, in the case of using the vertical grip device 30, the operating time of the imaging apparatus 10 can be extended about twice.

In the present embodiment, the imaging apparatus 10 to which the vertical grip device 30 is attached is a digital still camera, as shown in FIGS. 1 and 4.

The imaging apparatus 10 has an imaging apparatus side housing 12 which forms the exterior. Moreover, in this specification, it is assumed that left and right refers to a state when the imaging apparatus 10 is seen from a front side, a photographic subject side in an optical axis direction of an optical system refers to a front side, and an imaging device side in the optical axis direction of the optical system refers to a rear side.

The imaging apparatus side housing 12 has a thickness in the front and rear direction, a height in the up and down direction which is larger than the thickness, and a width in the left and right direction which is larger than the height.

A lens barrel 16 which accommodates and holds a photographing optical system 14 therein is provided on a front surface of the imaging apparatus side housing 12.

A shutter switch 18A used to perform imaging and a setting dial 18B used to set a photographing mode are provided on an upper end surface of the imaging apparatus side housing 12.

A display 20 on which an imaged picture is displayed, a plurality of operation switches 18C used to perform operations related to various kinds of operations, such as photographing, recording, and picture display, and a control switch 18D used to perform, for example, an operation of selecting a menu displayed on the display 20 are provided on the rear surface of the imaging apparatus side housing 12.

An internal thread 22 used for tripod attaching is provided on a bottom surface 19 of the imaging apparatus side housing 12.

In addition, a battery chamber 24 which is opened to the bottom surface 19 and to which one battery 50 (FIG. 9) is detachably attached is provided in a left side portion of the imaging apparatus side housing 12, and an opening of the battery chamber 24 is configured to be opened and closed by a lid (not shown).

An imaging apparatus side power supply terminal 26 and an imaging apparatus side signal terminal 28 are provided in a wall portion which forms the battery chamber 24.

The imaging apparatus side power supply terminal 26 is connected to a battery side terminal 52 (FIG. 9) of the battery 50 accommodated in the battery chamber 24 so that electric power is supplied from the battery 50. In addition, the imaging apparatus side power supply terminal 26 is connected to a grip device side power supply terminal 46, which will be described later, so that electric power is supplied from the vertical grip device 30. In the present embodiment, three imaging apparatus side power supply terminals 26 are provided.

In addition, the imaging apparatus side signal terminal 28 is formed to be connectable to the grip device side signal terminal 48 of the vertical grip device 30. In the present embodiment, a plurality of imaging apparatus side signal terminals 28 are provided.

As shown in FIG. 13, an imaging device 10A formed by using, for example, a CCD or a CMOS sensor which images a photographic subject image formed by the photographing optical system 14 is disposed in a rear portion of the lens barrel 16.

The imaging apparatus 10 generates image data on the basis of an imaging signal output from the imaging device 10A and is configured to include an image processing portion 10B that performs recording into a recording medium 2, such as a memory card, a display processing portion 10C that displays the image data on the display 20, a power supply portion 10D, a control portion 10E, and the like.

The power supply portion 10D serves to adjust the electric power, which is supplied through the imaging apparatus side power supply terminal 26, to predetermined current and voltage and supplies the adjusted current and voltage to the portions 10A, 10B, 10C, and 10E and the display 20.

The control portion 10E controls the image processing portion 10B, the display processing portion 10C, and the like in response to operations of the shutter switch 18A, the setting dial 18B, the operation switch 18C, and the control switch 18D and has a CPU which operates according to a control program.

In addition, the control portion 10E controls the image processing portion 10B, the display processing portion 10C, and the like by receiving the operation signal supplied from the vertical grip device 30 through the grip device side signal terminal 48 and the imaging apparatus side signal terminal 28.

Next, the vertical grip device 30 will be described in detail.

Figure 5:
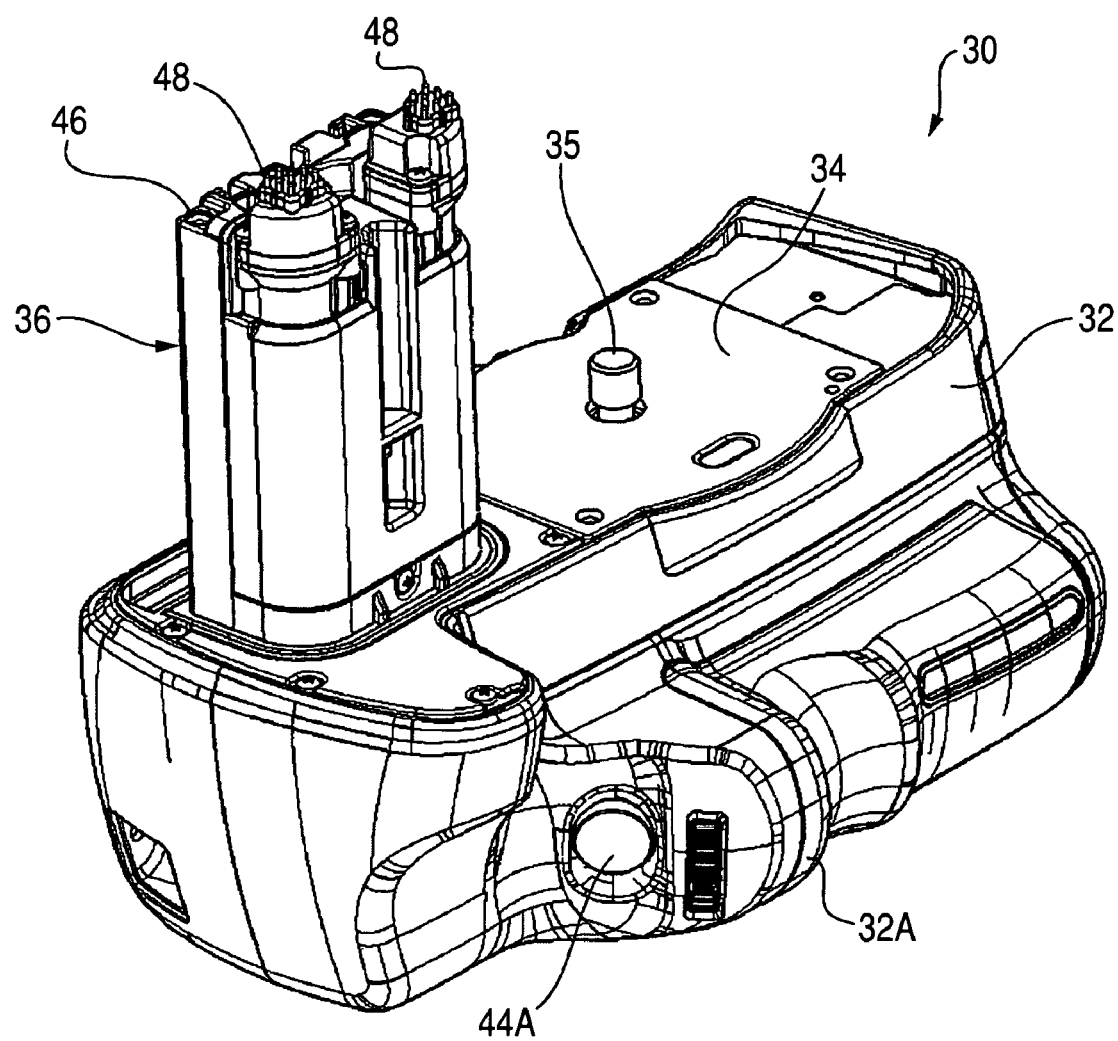
FIG. 5 is a perspective view illustrating the vertical grip device seen from the front side.
Figure 6:
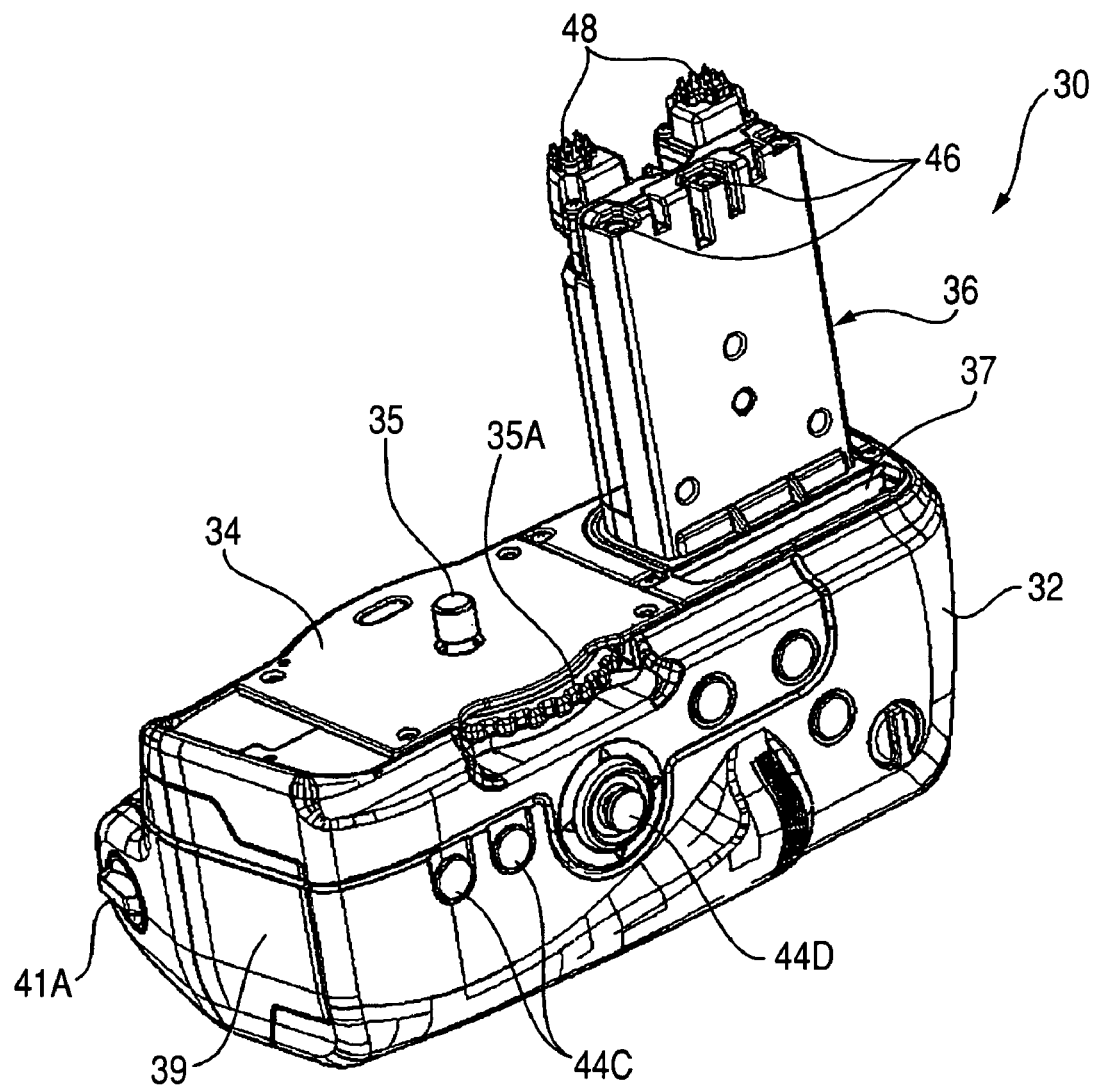
FIG. 6 is a perspective view illustrating the vertical grip device seen from the back side.
Figure 7:
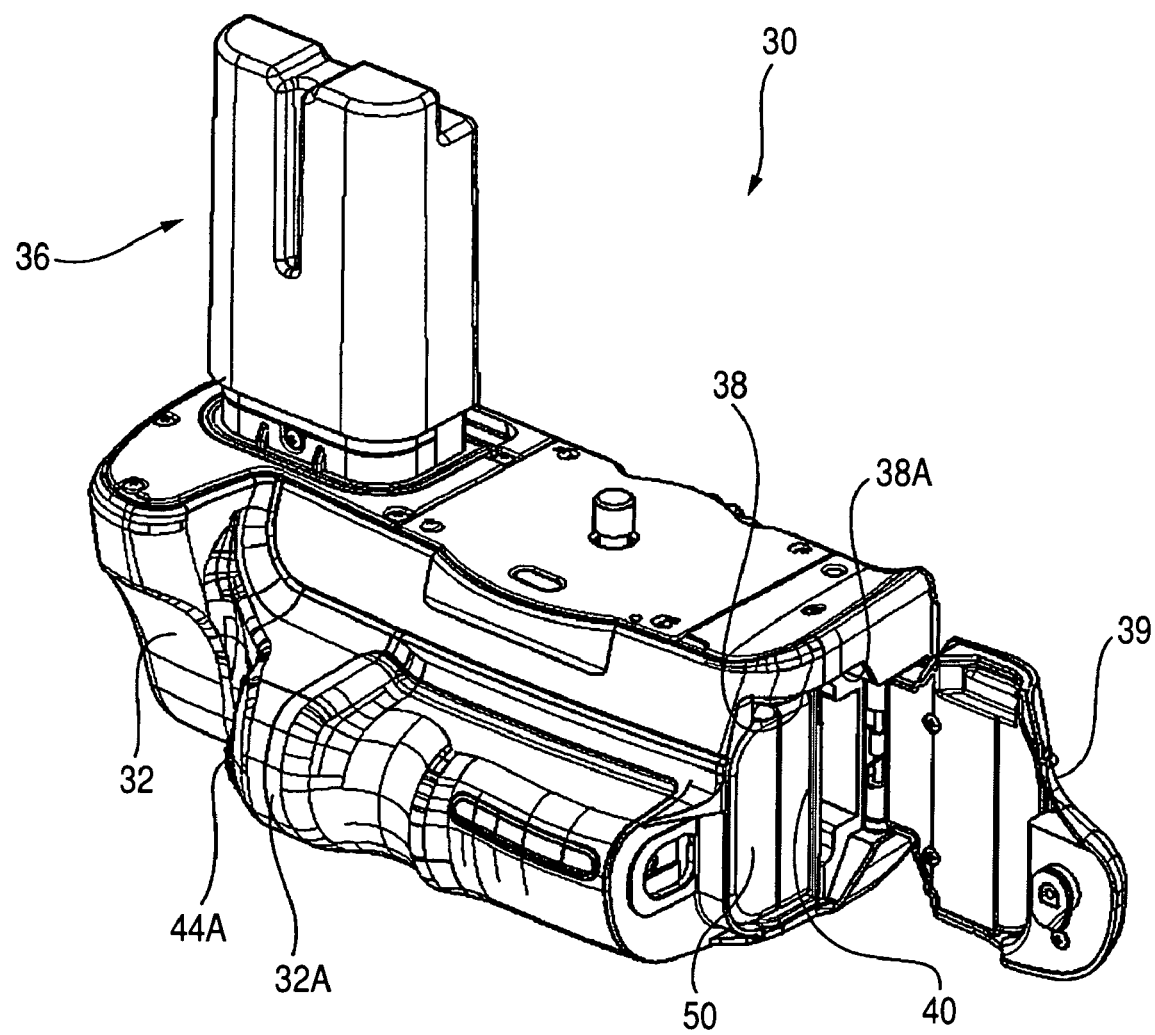
FIG. 7 is a perspective view illustrating a state where a battery is accommodated in a battery chamber of the vertical grip device.
Figure 8:
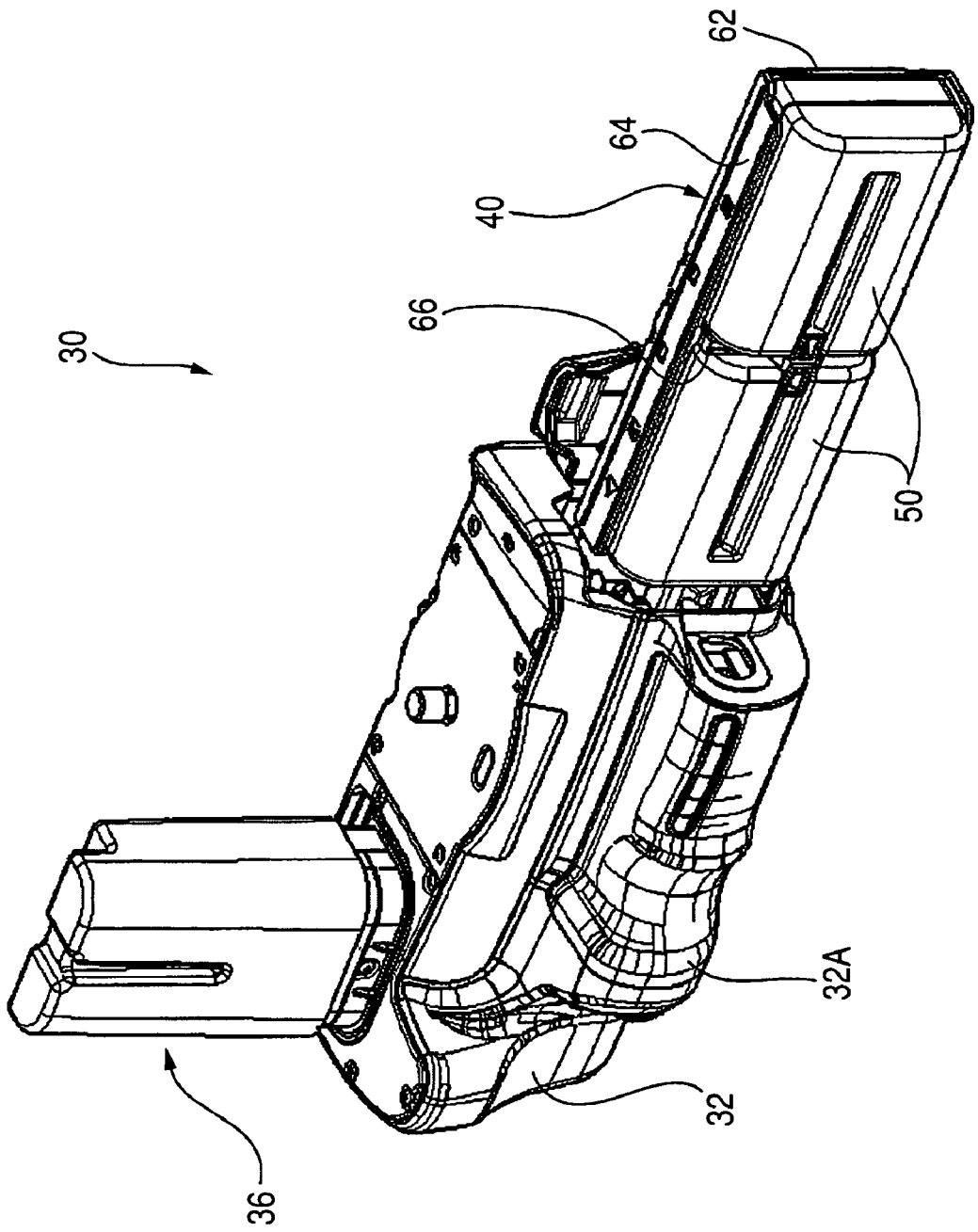
FIG. 8 is a perspective view illustrating a state of accommodating a battery in a battery chamber of the vertical grip device.

FIG. 5 is a perspective view illustrating the vertical grip device 30 seen from the front side. FIG. 6 is a perspective view illustrating the vertical grip device 30 seen from the back side. FIG. 7 is a perspective view illustrating a state where the battery 50 is accommodated in the battery chamber 38 of the vertical grip device 30. FIG. 8 is a perspective view illustrating a state of accommodating the battery 50 in the battery chamber 38 of the vertical grip device 30.

As shown in FIGS. 1, 3, 5, and 6, the vertical grip device 30 has the grip device side housing 32 and the battery chamber 38 is provided in the grip device side housing 32.

As shown in FIG. 5, the grip device side housing 32 has a shape thin and long in the left and right direction.

The grip portion 32A is provided in a front portion of the grip device side housing 32 and extends in the left and right direction while protruding frontward.

An attaching surface 34 having the same outline as the bottom surface 19 of the imaging apparatus side housing 12 is provided in an upper portion of the grip device side housing 32, and an attaching screw 35 that can be screwed into the internal thread 22 on the bottom surface of the imaging apparatus side housing 12 protrudes from the attaching surface 34.

As shown in FIG. 6, an operation dial 35A for performing rotational operation of the attaching screw 35 is provided in the upper portion of the grip device side housing 32, and a part of the operation dial 35A in the peripheral direction thereof is exposed to the rear surface of the grip device side housing 32 so that the rotational operation can be performed.

Furthermore, on the upper surface of the grip device side housing 32, an accommodation recess 37 which accommodates a lid (not shown) of the battery chamber 24 of the imaging apparatus 10 therein is formed so as to be opened upward.

As shown in FIG. 5, on the front surface of the grip device side housing 32, the shutter switch 44A is provided at a left end which is an end of the grip portion 32A in the longitudinal direction thereof. The shutter switch 44A has the same function as the shutter switch 18A provided in the imaging apparatus 10.

The operation switch 44C and the control switch 44D are provided on the rear surface of the grip device side housing 32, as shown in FIG. 6. The operation switch 44C and the control switch 44D have the same functions as the operation switch 18C and the control switch 18D provided in the imaging apparatus 10.

As shown in FIGS. 5 and 6, a pillar portion 36 inserted in the battery chamber 24 of the imaging apparatus 10 is provided in a left side portion of the upper portion of the grip device side housing 32.

The grip device side power supply terminal 46 connectable to the imaging apparatus side power supply terminal 26 and the grip device side signal terminal 48 connectable to the imaging apparatus side signal terminal 28 are provided in a tip portion of the pillar portion 36.

As shown in FIG. 13, the grip device side power supply terminal 46 is configured to be electrically connected to the two batteries 50 accommodated in the battery chamber 38 so that the electric power of the two batteries 50 is supplied to the grip device side power supply terminal 46.

As shown in FIG. 13, the grip device side signal terminal 48 is configured to be electrically connected to the shutter switch 44A, the operation switch 44C, and the control switch 44D so that operation signals from the switches 44A, 44C, and 44D are supplied to the grip device side signal terminal 48.

Figure 9:
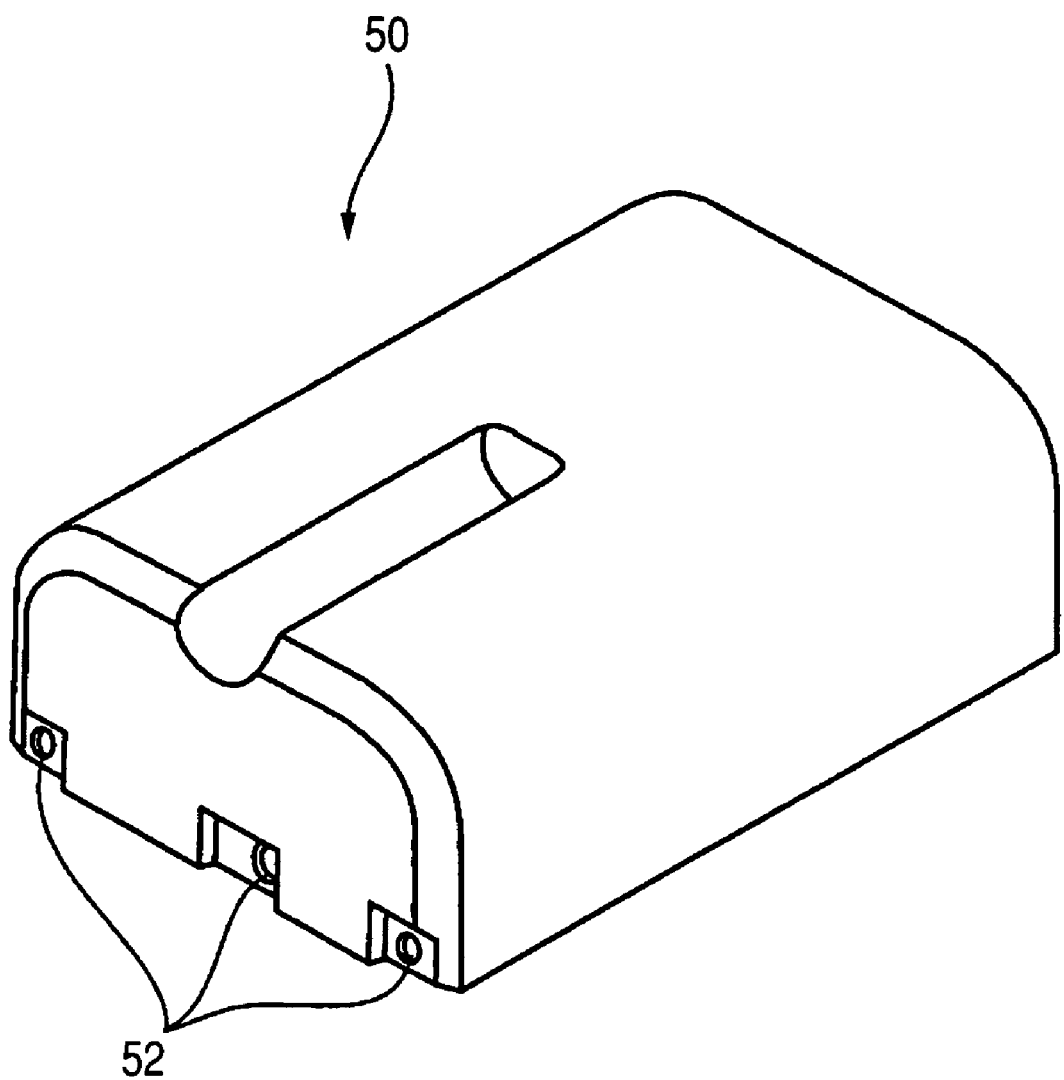
FIG. 9 is a perspective view illustrating a battery.

FIG. 9 is a perspective view illustrating the battery 50.

As shown in FIG. 9, the battery 50 has a thin and long shape with a thickness, a width larger than the thickness, and a length larger than the width, and three battery side terminals 52 are provided at the end in the longitudinal direction.

In the present embodiment, the battery 50 is a secondary battery which is rechargeable. Examples of such secondary battery include a lithium ion battery and a nickel hydrogen battery.

As shown in FIGS. 7 and 8, the battery chamber 38 is configured to accommodate the two batteries 50 therein in a state where the two batteries 50 are arranged such that the width direction of the two batteries 50 is the up and down direction of the grip device side housing 32, the battery side terminals 52 of the two batteries 50 face each other, and the longitudinal direction of the batteries 50 extends on the same straight line along the left and right direction of the grip device side housing 32.

More specifically, the battery chamber 38 has a thin and long shape that has the width along the front and rear direction of the housing, the height along the up and down direction of the housing which is larger than the width, and the depth which is larger than the height and extends along the left and right direction of the housing.

In addition, a battery chamber side connector 58 (FIG. 13) that is electrically connected with the grip device side power supply terminal 46 through a wiring material, such as a lead wire, is provided in the battery chamber 38.

A right end which is an end of the battery chamber 38 in the longitudinal direction thereof is opened to a right side portion of the grip device side housing 32, and a lid 39 which opens and closes an opening 38A is provided, shown in FIG. 7.

In addition, FIG. 7 shows a state where the battery 50 is accommodated in the battery chamber 38, and FIG. 8 shows a state of accommodating the battery 50 in the battery chamber 38.

In the present embodiment, a battery tray 40 in which the two batteries 50 are accommodated is provided, and the two batteries 50 are attached to or detached from the battery chamber 38 together with the battery tray 40.

Figure 10:
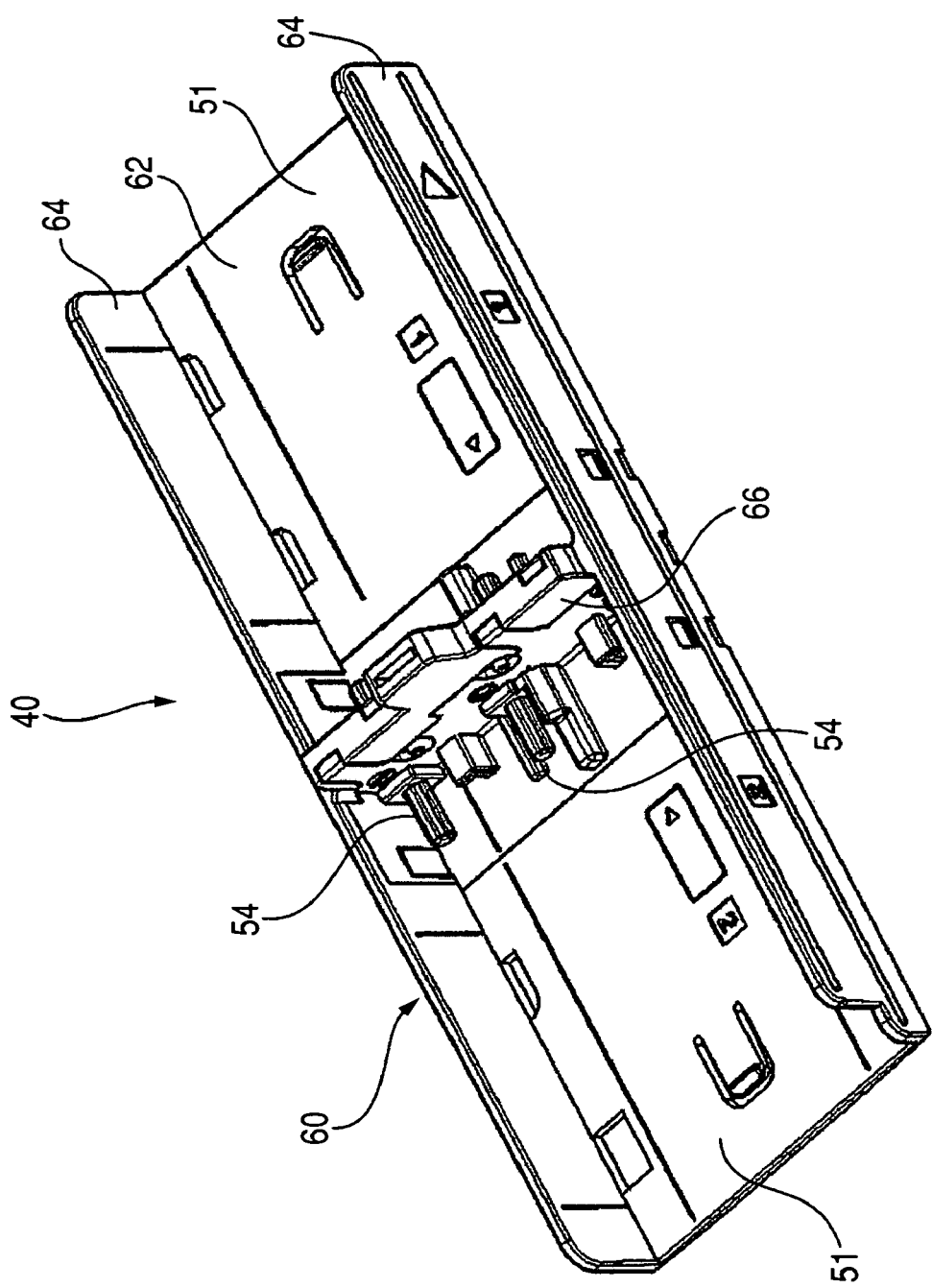
FIG. 10 is a perspective view illustrating a battery tray.
Figure 11:
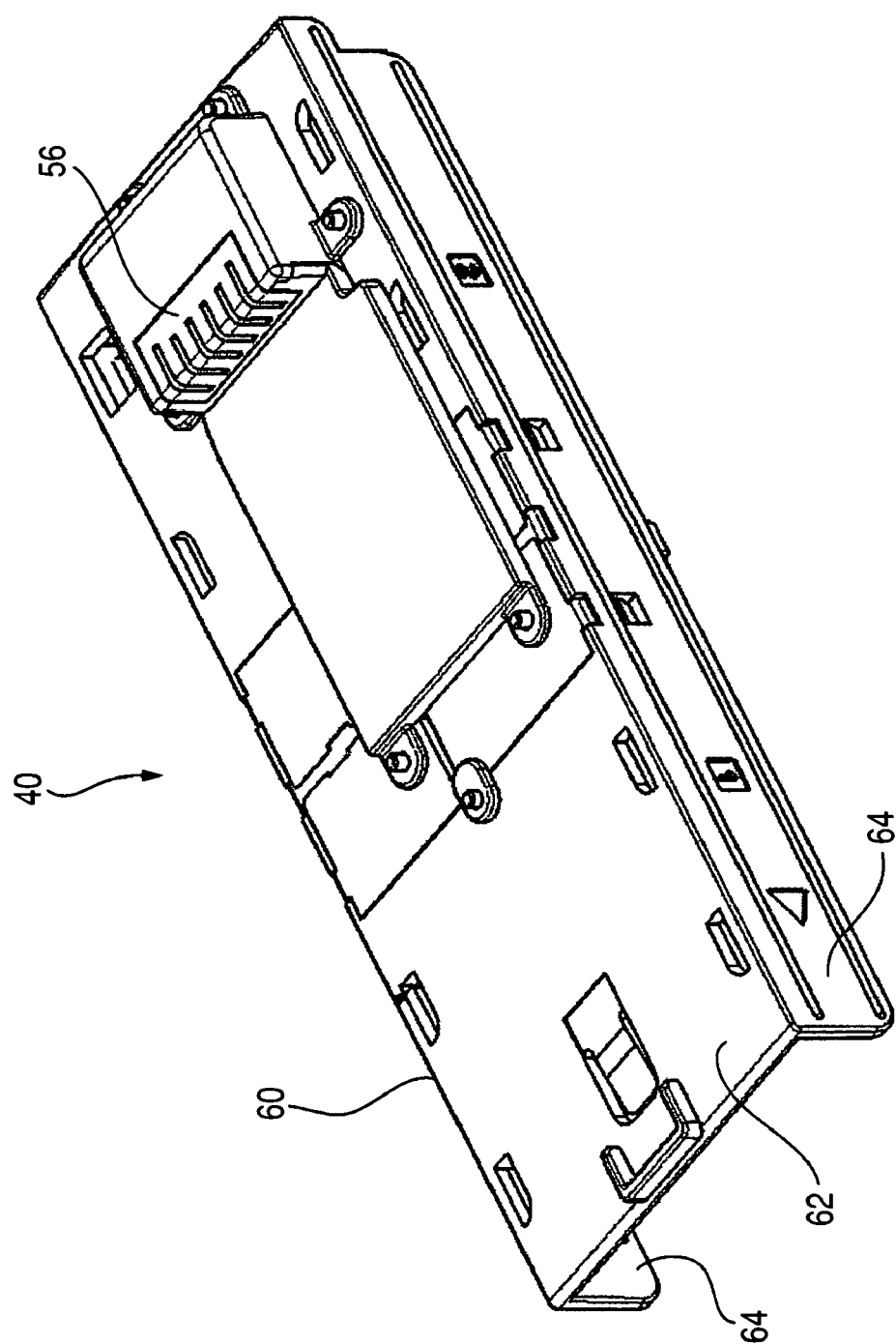
FIG. 11 is a perspective view illustrating the battery tray moved upside down.
Figure 12:
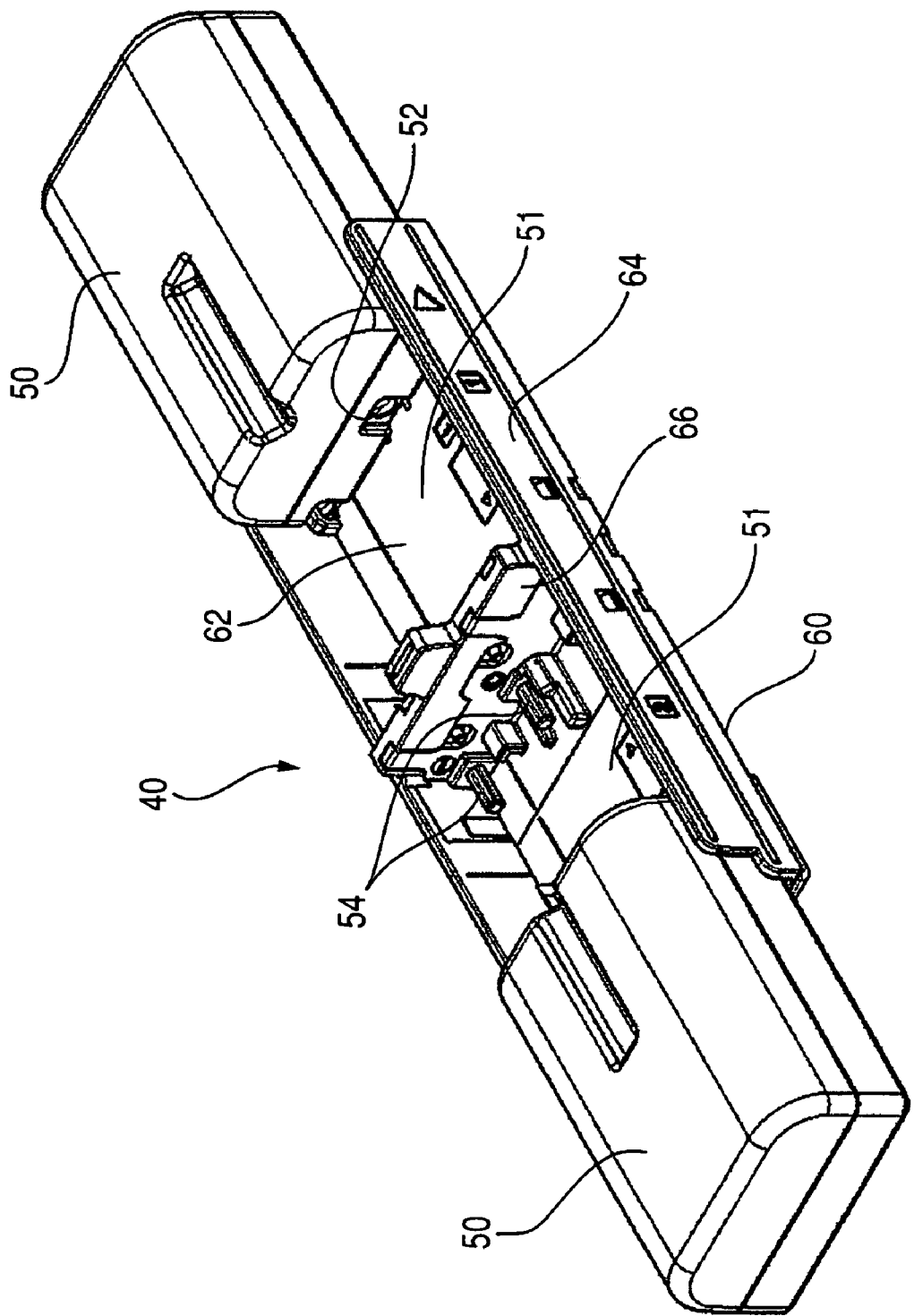
FIG. 12 is a view explaining accommodation of a battery into the battery tray.

FIG. 10 is a perspective view illustrating the battery tray 40. FIG. 11 is a perspective view illustrating the battery tray 40 moved upside down. FIG. 12 is a view explaining accommodation of the battery 50 into the battery tray 40.

As shown in FIG. 12, the battery tray 40 includes two battery accommodation spaces 51 each of which has a thin and long shape and which accommodate the two batteries 50 therein in a state where the two batteries 50 are arranged such that the battery side terminals 52 of the two batteries 50 face each other and the longitudinal direction of the batteries 50 extends on the same straight line. The battery tray 40 has a thin and long shape in the direction in which the battery accommodation spaces 51 are arranged.

The battery tray 40 includes a frame 60, a tray side terminal 54 electrically connectable to the battery side terminal 52 of the battery 50, and a tray side connector 56 which is electrically connected to the tray side terminal 54 and is engaged with or disengaged from an external apparatus (battery chamber side connector 58 of the battery chamber 38 of the vertical grip device 30), as shown in FIGS. 10 and 11.

The frame 60 has a thin and long shaped bottom wall 62 having a length larger than the width, a side wall 64 rising from both sides of the surface of the bottom wall 62 in the width direction thereof, and a middle wall 66 that rises from a middle surface of the bottom wall 62 in the longitudinal direction thereof and extends along the width direction thereof and is integrally formed by synthetic resin.

The two battery accommodation spaces 51 are formed by the bottom wall 62, the side walls 64 on both the sides, and the middle wall 66 with the middle wall 66 interposed therebetween. Accordingly, the two battery accommodation spaces 51 are formed in the shape opened in the direction distant from the middle wall 66 at both ends of the bottom wall 62 in the longitudinal direction thereof.

The tray side terminal 54 is provided on each of both sides of the middle wall 66 and is connected to the battery side terminal 52 of the battery 50 accommodated in each battery accommodation space 51.

The tray side connector 56 is provided at the end of the bottom wall 62 in the longitudinal direction thereof on a rear surface of the bottom wall 62.

In addition, the tray side terminal 54 and the tray side connector 56 are connected to each other with a lead wire (not shown).

Next, a method of using the vertical grip device 30 will be described.

The two batteries 50 are accommodated in the battery accommodation spaces 51 of the battery tray 40, the two batteries 50 are inserted into the battery chamber 38 of the vertical grip device 30 together with the battery tray 40, and the lid 39 is closed.

Then, the batteries 50 are removed from the battery chamber 24 of the imaging apparatus 10 to thereby make the battery chamber 24 empty, the pillar portion 36 of the vertical grip device 30 is inserted in the battery chamber 24, and an upper portion of the grip device side housing 32 is made to match a lower portion of the imaging apparatus side housing 12 of the imaging apparatus 10. In this case, the lid of the battery chamber 24 of the imaging apparatus 10 is accommodated in the accommodation recess 37.

Then, the vertical grip device 30 is connected with the imaging apparatus 10 by performing a rotation operation of the operation dial 35A and screwing the attaching screw 35 to the internal thread 22.

By inserting the pillar portion 36 into the battery chamber 24, the grip device side power supply terminal 46 is connected to the imaging apparatus side power supply terminal 26 and the grip device side signal terminal 48 is connected to the imaging apparatus side signal terminal 28.

Thus, electric power of the two batteries 50 accommodated in the vertical grip device 30 is supplied from the grip device side power supply terminal 46 to the power supply portion 10D through the imaging apparatus side power supply terminal 26, such that the imaging apparatus 10 can operate and operation signals from the switches 44A, 44C, and 44D of the vertical grip device 30 can be supplied from the grip device side signal terminal 48 to the control portion 10E through the imaging apparatus side signal terminal 28.

Accordingly, by operating each of the switches 44A, 44C, and 44D of the vertical grip device 30, various kinds of operations, such as an imaging operation or an image reproduction operation, corresponding to the switches 44A, 44C, and 44D can be performed by the imaging apparatus 10.

According to the present embodiment, the two batteries 50 are accommodated in the battery chamber 38 in a state where the two batteries 50 are arranged such that the battery side terminals 52 of the two batteries 50 face each other and the longitudinal direction of the batteries 50 extends on the same straight line along the left and right direction of the grip device side housing 32. As a result, since it is possible to reduce a space that the grip device side housing 32 of the vertical grip device 30 occupies in the front and rear direction, the present embodiment is advantageous in making the vertical grip device 30 compact, improving the operability of the vertical grip device 30 at the time of photographing, improving the portability and making the vertical grip device 30 easily placed, and realizing a high-level design.

Furthermore, in the present embodiment, since the two batteries 50 are accommodated in the battery chamber 38 such that the width direction of the two batteries 50 are parallel to the up and down direction of the grip device side housing 32, the present embodiment is particularly advantageous in reducing the size of the grip device side housing 32 in the front and rear direction thereof. Thus, the present embodiment is further advantageous in making the vertical grip device 30 thin, improving the operability of the vertical grip device 30 at the time of photographing, improving the portability and making the vertical grip device 30 easily placed, and realizing a high-level design.

Furthermore, in the present embodiment, since the battery chamber 38 is made to extend in the left and right direction of the grip device side housing 32, the lid 39 which opens and closes the battery chamber 38 can be disposed on the right side of the grip device side housing 32. Accordingly, unlike a case in the related art where the lid 39 is positioned on the front surface or the rear surface of the grip device side housing 32, the lid 39 is not gripped. As a result, since the grip portion 32A can be held firmly, the present embodiment is advantageous in that the usability of the vertical grip device 30 is improved.

Furthermore, in the present embodiment, the accommodation recess 37 in which the lid of the battery chamber 24 of the imaging apparatus 10 is accommodated is provided in the grip device side housing 32. Accordingly, since the lid is not obstructive, the present embodiment is advantageous in improving the usability of the vertical grip device 30.

Furthermore, in the present embodiment, in a state where the battery tray 40 is accommodated in the battery chamber 38, one battery accommodation space 51 of the battery tray 40 is opened to the opening 38A of the battery chamber 38. Accordingly, since the battery tray 40 can also be used as a member that divides the battery chamber 38, the present embodiment is advantageous in increasing the practical effect of the battery tray 40. That is, in this case, use of the vertical grip device 30 by one battery 50 becomes possible by inserting the battery 50 in the battery accommodation space 51, which faces the opening 38A or taking out the battery 50 from the battery accommodation space 51.

Figure 14:
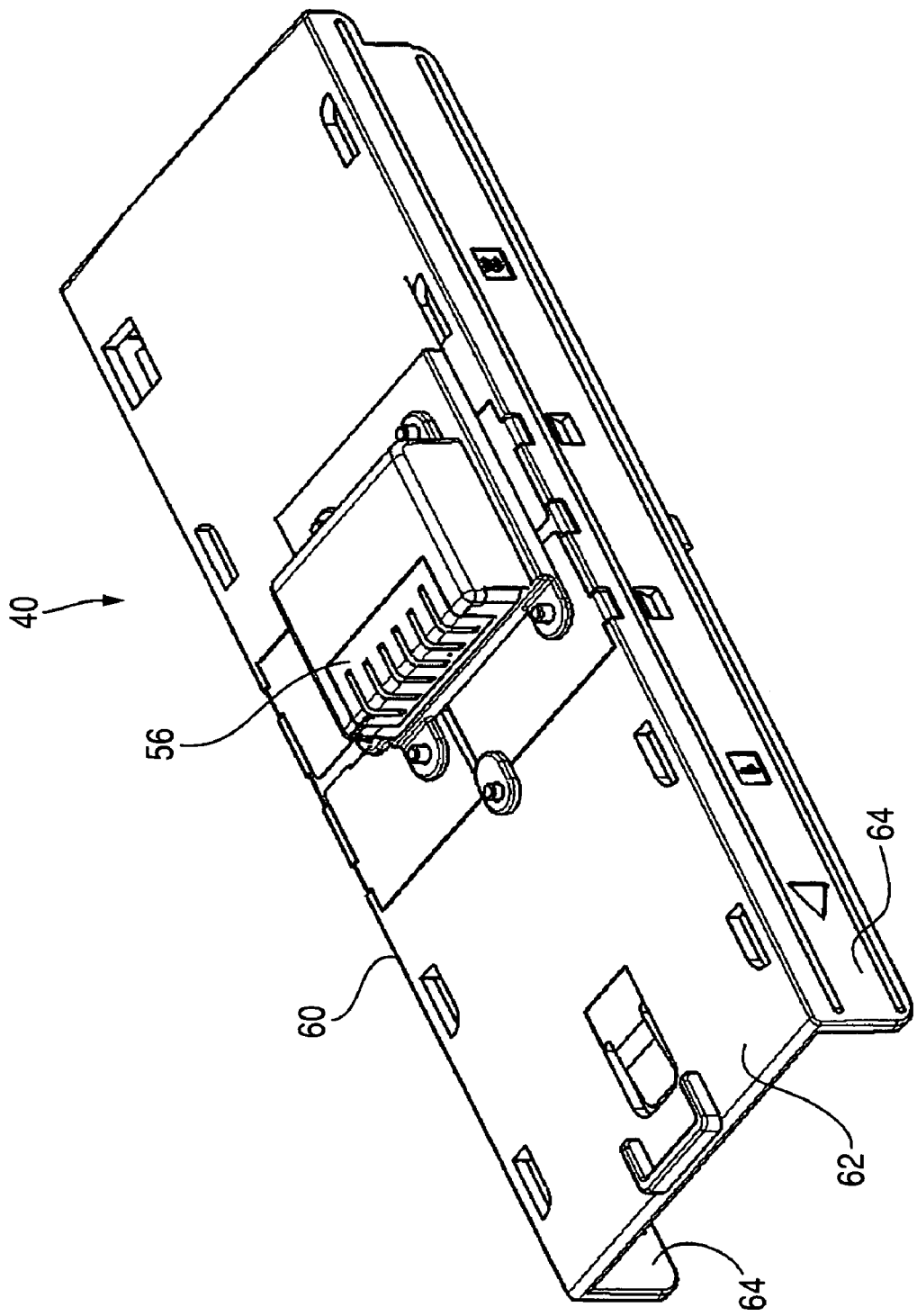
FIG. 14 is an explanatory view illustrating a modified example of the battery tray.

In addition, it is possible to make the length of the lead wire, which connects the tray side terminal 54 and the tray side connector 56 with each other, shortest by providing the tray side connector 56 in the middle portion of the bottom wall 62 in the longitudinal direction on the rear surface of the bottom wall 62, as shown in FIG. 14.

In this case, since a resistance component (conductor resistance) that a lead wire has can be suppressed, loss of the power of the battery 50 can be reduced, which is advantageous in saving the power and making the life of the battery 50 long.

Furthermore, in the case of design of an external apparatus that uses the battery tray 40 configured such that the wiring line on the side of the battery tray 40 (wiring line of the battery tray 40) is shortest as described above, the electric power of the battery 50 can be saved by designing the external apparatus such that the wiring line is as shortest as possible in consideration of only a wiring line after the battery tray 40 (wiring line extending from the battery chamber side connector 58 to the power supply portion 10D). As a result, the present embodiment is advantageous in improving the efficiency of design.

In addition, when the tray side connector 56 is provided in the middle portion of the bottom wall 62 in the longitudinal direction thereof, the tray side connector 56 is positioned in the middle of the battery tray 40 in the longitudinal direction thereof. Accordingly, the battery chamber side connector 58 connected to the tray side connector 56 can be positioned in the middle of the battery chamber 38 in the depth direction thereof. As a result, the present embodiment is advantageous in simply executing the layout of wiring materials that connect the battery chamber side connector 58 and the grip device side power supply terminal 46 with each other.

Moreover, in the present embodiment, the case where the two batteries 50 are accommodated in the battery chamber 38 in a state where the two batteries 50 are arranged such that the battery side terminals 52 of the two batteries 50 face each other and the longitudinal direction of the batteries 50 extends on the same straight line along the left and right direction of the grip device side housing 32 and the case where the two batteries 50 are accommodated in the battery tray in a state where the two batteries 50 are arranged such that the battery side terminals 52 of the two batteries 50 face each other and the longitudinal direction of the batteries 50 extends on the same straight line along the left and right direction of the grip device side housing 32 have been described. However, the two batteries 50 may be accommodated in a state where the battery side terminals 52 are disposed in the opposite directions or the battery side terminals 52 are disposed in the same direction. Also in this case, since it is possible to reduce the space that the grip device side housing 32 of the vertical grip device 30 occupies in the front and rear direction, it is possible to make the vertical grip device 30 compact, to improve the operability of the vertical grip device 30 at the time of photographing, to improve the portability and make the vertical grip device 30 easily placed, and to realize a high-level design.

In addition, a structure that includes a protruding portion and a recessed portion engaged with each other in order to engage/disengage the battery 50 with/from the battery chamber 38 or the battery tray 40 may be arbitrarily provided.

In addition, an electronic apparatus to which the present invention is applied is not limited to the vertical grip device 30, but the present invention is widely applied to electronic apparatuses with battery chambers. For example, the present invention may also be applied to a video camera. In this case, a battery chamber accommodates the two batteries therein in a state where the batteries are arranged such that the width direction of the batteries is perpendicular to the longitudinal direction of the housing of the electronic apparatus and the longitudinal direction of the batteries extends on the same straight line along the longitudinal direction of the housing.

It should be understood by those skilled in the art that various modifications, combinations, sub-combinations and alterations may occur depending on design requirements and other factors insofar as they are within the scope of the appended claims or the equivalents thereof.

What is claimed is:

1. A battery tray, comprising:
a battery tray body extending along a lengthwise axis in a lengthwise direction, a widthwise axis in a widthwise direction and a heightwise axis in a heightwise direction, the lengthwise axis, the widthwise axis and the heightwise axis interconnecting perpendicularly with one another at a common point to form a conventional Cartesian coordinate system, the, heightwise axis and the lengthwise axis defining a heightwise-lengthwise plane, the battery tray body having a bottom wall panel extending in the widthwise direction and in the lengthwise direction terminating in opposing bottom wall panel edges spanning the widthwise direction, a pair of side wall panels disposed apart from and extending parallel to one another and connected to the bottom wall panel to extend in the lengthwise and heightwise directions to form a channel with the bottom wall panel, each side wall panel having a side wall top edge extending in the lengthwise direction and a side wall end edge connected to the side wall top edge and the bottom wall panel and extending in the heightwise direction, and a middle wall panel disposed in the channel and connected to and between the pair of side wall panels and to the bottom wall panel to form a forward battery accommodation space and a rearward battery accommodation space disposed on opposing sides of the middle wall panel with the pair of side wall panels and the bottom wall panel, the middle wall panel having a middle wall top edge spanning the widthwise direction, the forward battery accommodation space having a first forward accommodation space unobstructed opening and a second forward accommodation space unobstructed opening oriented generally perpendicularly to one another as viewed in the heightwise-lengthwise plane and intersecting one another along a forward intersection line extending in the widthwise direction, the rearward battery accommodation space having a first rearward accommodation space unobstructed opening and a second rearward accommodation space unobstructed opening oriented generally perpendicularly to one another as viewed in the heightwise-lengthwise plane and intersecting one another along a forward intersection line extending in the widthwise direction, each one of the first forward accommodation space unobstructed opening and first rearward accommodation space unobstructed opening is defined by the side wall end edges, and a respective one of the bottom wall panel edges and a respective one of the forward and rearward intersection lines and each one of the second forward accommodation space unobstructed opening and second rearward accommodation space unobstructed opening is defined by the side wall top edges, the middle wall top edge and a respective one of the forward and rearward intersection lines;

a pair of tray side terminal assemblies connected to the middle wall panel, one of the pair of tray side terminal assemblies having at least one rigid terminal projecting from the middle wall panel in the lengthwise direction and directed towards the first forward accommodation space unobstructed opening into the forward battery accommodation space and a remaining one of the pair of tray side terminal assemblies having at least one rigid terminal projecting from the middle wall panel in the lengthwise direction and directed towards the first rearward accommodation space unobstructed opening disposed opposite the first forward accommodation space unobstructed opening and into the rearward battery accommodation space.

2. The battery tray according to claim 1,
wherein a tray side terminal which is electrically connectable to a battery side terminal of a battery accommodated in each of the forward and rearward battery accommodation spaces is provided between the forward and rearward battery accommodation spaces.

3. The battery tray according to claim 2, further comprising:
a frame;
the tray side terminal; and
a tray side connector that is electrically connected to the tray side terminal and is engaged with or disengaged from an external apparatus,
wherein the frame has a thin and long shaped bottom wall whose length is larger than a width thereof, a side wall rising from both sides of a surface of the bottom wall in the width direction thereof, and a middle wall that rises from a middle surface of the bottom wall in the longitudinal direction thereof and extends along the width direction,
the tray side terminal is provided on the middle wall, and the tray side connector is provided on a rear surface of the bottom wall.

4. The battery tray according to claim 3,
wherein the tray side connector is provided in the middle of the bottom wall in the longitudinal direction thereof.

5. An electronic apparatus comprising:
a housing having a battery chamber to which a battery is detachably attached together with a battery tray,
wherein the battery tray a battery tray body and pair of tray side terminal assemblies, the battery tray body extending along a lengthwise axis in a lengthwise direction, a widthwise axis in a widthwise direction and a heightwise axis in a heightwise direction, the lengthwise axis, the widthwise axis and the heightwise axis interconnecting perpendicularly with one another at a common point to form a conventional Cartesian coordinate system, the heightwise axis and the lengthwise axis defining a heightwise-lengthwise plane, the battery tray body having a bottom wall panel extending in the widthwise direction and in the lengthwise direction terminating in opposing bottom wall panel edges spanning the widthwise direction, a pair of side wall panels disposed apart from and extending parallel to one another and connected to the bottom wall panel to extend in the lengthwise and heightwise directions to form a channel with the bottom wall panel, each side wall panel having a side wall top edge extending in the lengthwise direction and a side wall end edge connected to the side wall top edge and the bottom wall panel and extending in the heightwise direction, and a middle wall panel disposed in the channel and connected to and between the pair of side wall panels and to the bottom wall panel to form a forward battery accommodation space and a rearward battery accommodation space disposed on opposing sides of the middle wall panel with the pair of side wall panels and the bottom wall panel, the middle wall panel having a middle wall top edge spanning the widthwise direction, the forward battery accommodation space having a first forward accommodation space unobstructed opening and a second forward accommodation space unobstructed opening oriented generally perpendicularly to one another as viewed in the heightwise-lengthwise plane and intersecting one another along a forward intersection line extending in the widthwise direction, the rearward battery accommodation space having a first rearward accommodation space unobstructed opening and a second rearward accommodation space unobstructed opening oriented generally perpendicularly to one another as viewed in the heightwise-lengthwise plane and intersecting one another along a rearward intersection line extending in the widthwise direction, each one of the first forward accommodation space unobstructed opening and first rearward accommodation space unobstructed opening is defined by the side wall end edges, a respective one of the bottom wall panel edges and a respective one of the forward and rearward intersection lines and each one of the second forward accommodation space unobstructed opening and second rearward accommodation space unobstructed opening is defined by the side wall top edges, and the middle wall top edge and a respective one of the forward and rearward intersection lines, the pair of tray side terminal assemblies connected to the middle wall panel, one of the pair of tray side terminal assemblies having at least one rigid terminal projecting from the middle wall panel in the lengthwise direction and directed towards the first forward accommodation space unobstructed opening into the forward battery accommodation space and a remaining one of the pair of tray side terminal assemblies having at least one rigid terminal projecting from the middle wall panel in the lengthwise direction and directed towards the first rearward accommodation space unobstructed opening disposed opposite the first forward accommodation space unobstructed opening and into the rearward battery accommodation space, the housing has a thin and long shape, the battery chamber has a thin and long shape along the longitudinal direction of the housing and one end of the battery chamber in the longitudinal direction thereof is opened to the housing through an opening,
the battery tray is provided to be detachably attached through the opening along the longitudinal direction of the battery tray, and
a lid which opens and closes the opening is provided.

6. A vertical grip device engaged with or disengaged from a lower portion of an imaging apparatus, comprising:
a housing that has a grip portion extending in the left and right direction and has a thin and long shape in the left and right direction; and a battery chamber which is provided in the housing and to which a battery is detachably attached together with a battery tray, wherein the battery tray has a thin and long shape in which two batteries each having a thin and long shape are accommodated in a state where the batteries are arranged such that the longitudinal direction of the batteries extends on the same straight line, the battery chamber has a thin and long shape along the longitudinal direction of the housing and one end of the battery chamber in the longitudinal direction thereof is opened to the housing through an opening, the battery tray is provided to be detachably attached through the opening along the longitudinal direction of the battery tray, and a lid which opens and closes the opening is provided, wherein the battery tray includes a battery tray body and pair of tray side terminal assemblies, the battery tray body extending along a lengthwise axis in a lengthwise direction, a widthwise axis in a widthwise direction and a heightwise axis in a heightwise direction, the lengthwise axis, the widthwise axis and the heightwise axis interconnecting perpendicularly with one another at a common point to form a conventional Cartesian coordinate system, the heightwise axis and the lengthwise axis defining a heightwise-lengthwise plane, the battery tray body having a bottom wall panel extending in the widthwise direction and in the lengthwise direction terminating in opposing bottom wall panel edges spanning the widthwise direction, a pair of side wall panels disposed apart from and extending parallel to one another and connected to the bottom wall panel to extend in the lengthwise and heightwise directions to form a channel with the bottom wall panel, each side wall panel having a side wall top edge extending in the lengthwise direction and a side wall end edge connected to the side wall top edge and the bottom wall panel and extending in the heightwise direction, and a middle wall panel disposed in the channel and connected to and between the pair of side wall panels and to the bottom wall panel to form a forward battery accommodation space and a rearward battery accommodation space disposed on opposing sides of the middle wall panel with the pair of side wall panels and the bottom wall panel, the middle wall panel having a middle wall top edge spanning the widthwise direction, the forward battery accommodation space having a first forward accommodation space unobstructed opening and a second forward accommodation space unobstructed opening oriented generally perpendicularly to one another as viewed in the heightwise-lengthwise plane and intersecting one another along a forward intersection line extending in the widthwise direction, the rearward battery accommodation space having a first rearward accommodation space unobstructed opening and a second rearward accommodation space unobstructed opening oriented generally perpendicularly to one another as viewed in the heightwise-lengthwise plane and intersecting one another along a rearward intersection line extending in the widthwise direction, each one of the first forward accommodation space unobstructed opening and first rearward accommodation space unobstructed opening is defined by the side wall end edges, a respective one of the bottom wall panel edges and a respective one of the forward and rearward intersection lines and each one of the second forward accommodation space unobstructed opening and second rearward accommodation space unobstructed opening is defined by the side wall top edges, the middle wall top edge and a respective one of the forward and rearward intersection lines, the pair of tray side terminal assemblies connected to the middle wall panel, one of the pair of tray side terminal assemblies having at least one rigid terminal projecting from the middle wall panel in the lengthwise direction and directed towards the first forward accommodation space unobstructed opening into the forward battery accommodation space and a remaining one of the pair of tray side terminal assemblies having at least one rigid terminal projecting from the middle wall panel in the lengthwise direction and directed towards the first rearward accommodation space unobstructed opening disposed opposite the first forward accommodation space unobstructed opening and into the rearward battery accommodation space.

7. The vertical grip device according to claim 6, wherein the battery has a thickness, a width larger than the thickness, and a length larger than the width, and the battery chamber is provided such that the battery is detachably attached together with the tray in a state where the width direction of the battery accommodated in the tray is an up and down direction of the housing.

8. The vertical grip device according to claim 6, wherein a battery side terminal is provided in an end of the battery in the longitudinal direction thereof, and the two batteries are arranged such that battery side terminals of the two batteries face each other in the tray.

9. An electronic apparatus comprising:

a housing provided with a battery chamber, a battery tray, wherein the battery chamber has a thin and long shape in which two batteries each having a thin and long shape are accommodated in a state where the batteries are arranged such that the longitudinal direction of the batteries extends on the same straight line, an end of the battery chamber in the longitudinal direction thereof is opened through an opening provided in the housing, and a lid which opens and closes the opening is provided, wherein the battery chamber is sized and adapted to slidably receive the battery tray, the battery tray including a battery tray body and a pair of tray side terminal assemblies, the battery tray body extending along a lengthwise axis in a lengthwise direction, a widthwise axis in a widthwise direction and a heightwise axis in a heightwise direction, the lengthwise axis, the widthwise axis and the heightwise axis interconnecting perpendicularly with one another at a common point to form a conventional Cartesian coordinate system, the heightwise axis and the lengthwise axis defining a heightwise-lengthwise plane, the battery tray body having a bottom wall panel extending in the widthwise direction and in the lengthwise direction terminating in opposing bottom wall panel edges spanning the widthwise direction, a pair of side wall panels disposed apart from and extending parallel to one another and connected to the bottom wall panel to extend in the lengthwise and heightwise directions to form a channel with the bottom wall panel, each side wall panel having a side wall top edge extending in the lengthwise direction and a side wall end edge connected to the side wall top edge and the bottom wall panel and extending in the heightwise direction, and a middle wall panel disposed in the channel and connected to and between the pair of side wall panels and to the bottom wall panel to form a forward battery accommodation space and a rearward battery accommodation space disposed on opposing sides of the middle wall panel with the pair of side wall panels and the bottom wall panel, the middle wall panel having a middle wall top edge spanning the widthwise direction, the forward battery accommodation space having a first forward accommodation space unobstructed opening and a second forward accommodation space unobstructed opening oriented generally perpendicularly to one another as viewed in the heightwise-lengthwise plane and intersecting one another along a forward intersection line extending in the widthwise direction, the rearward battery accommodation space having a first rearward accommodation space unobstructed opening and a second rearward accommodation space unobstructed opening oriented generally perpendicularly to one another as viewed in the heightwise-lengthwise plane and intersecting one another along a rearward intersection line extending in the widthwise direction, each one of the first forward accommodation space unobstructed opening and first rearward accommodation space unobstructed opening is defined by the side wall end edges, a respective one of the bottom wall panel edges and a respective one of the forward and rearward intersection lines and each one of the second forward accommodation space unobstructed opening and second rearward accommodation space unobstructed opening is defined by the side wall top edges~ and the middle wall top edge and a respective one of the imaginary forward and rearward intersection lines, the pair of tray side terminal assemblies connected to the middle wall panel, one of the pair of tray side terminal assemblies having at least one rigid terminal projecting from the middle wall panel in the lengthwise direction and directed towards the first forward accommodation space unobstructed opening into the forward battery accommodation space and a remaining one of the pair of tray side terminal assemblies having at least one rigid terminal projecting from the middle wall panel in the lengthwise direction and directed towards the first rearward accommodation space unobstructed opening disposed opposite the first forward accommodation space unobstructed opening and into the rearward battery accommodation space.

10. A vertical grip device engaged with or disengaged from a lower portion of an imaging apparatus, comprising:
 a housing that has a grip portion extending in the left and right direction and has a thin and long shape in the left and right direction;
 a battery tray; and
 a battery chamber provided in the housing,
 wherein the battery chamber has a thin and long shape with a width extending along the front and rear direction of the housing, a height which is larger than the width and extends along the up and down direction of the housing, and a depth which is larger than the height and extends along the left and right direction of the housing,
 an end of the battery chamber in the longitudinal direction thereof is opened through an opening provided in the housing, and
 a lid which opens and closes the opening is provided,
 wherein the battery chamber is sized and adapted to slidably receive the battery tray, the battery tray including a battery tray body and a pair of tray side terminal assemblies, the battery tray body extending along a lengthwise axis in a lengthwise direction, a widthwise axis in a widthwise direction and a heightwise axis in a heightwise direction, the lengthwise axis, the widthwise axis and the heightwise axis interconnecting perpendicularly with one another at a common point to form a conventional Cartesian coordinate system, the heightwise axis and the lengthwise axis defining a heightwise-lengthwise plane, the battery tray body having a bottom wall panel extending in the widthwise direction and in the lengthwise direction terminating in opposing bottom wall panel edges spanning the widthwise direction, a pair of side wall panels disposed apart from and extending parallel to one another and connected to the bottom wall panel to extend in the lengthwise and heightwise directions to form a channel with the bottom wall panel, each side wall panel having a side wall top edge extending in the lengthwise direction and a side wall end edge connected to the side wall top edge and the bottom wall panel and extending in the heightwise direction, and a middle wall panel disposed in the channel and connected to and between the pair of side wall panels and to the bottom wall panel to form a forward battery accommodation space and a rearward battery accommodation space disposed on opposing sides of the middle wall panel with the pair of side wall panels and the bottom wall panel, the middle wall panel having a middle wall top edge spanning the widthwise direction, the forward battery accommodation space having a first forward accommodation space unobstructed opening and a second forward accommodation space unobstructed opening oriented generally perpendicularly to one another as viewed in the heightwise-lengthwise plane and intersecting one another along a forward intersection line extending in the widthwise direction, the rearward battery accommodation space having a first rearward accommodation space unobstructed opening and a second rearward accommodation space unobstructed opening oriented generally perpendicularly to one another as viewed in the heightwise-lengthwise plane and intersecting one another along a rearward intersection line extending in the widthwise direction, each one of the first forward accommodation space unobstructed opening and first rearward accommodation space unobstructed opening is defined by the side wall end edges, a respective one of the bottom wall panel edges and a respective one of the forward and rearward intersection lines and each one of the second forward accommodation space unobstructed opening and second rearward accommodation space unobstructed opening is defined by the side wall top edges, the middle wall top edge mad a respective one of the forward and rearward intersection lines, the pair of tray side terminal assemblies connected to the middle wall panel, one of the pair of tray side terminal assemblies having at least one rigid terminal projecting from the middle wall panel in the lengthwise direction and directed towards the first forward accommodation space unobstructed opening into the forward battery accommodation space and a remaining one of the pair of tray side terminal assemblies having at least one rigid terminal projecting from the middle wall panel in the lengthwise direction and directed towards the first rearward accommodation space unobstructed opening disposed opposite the first forward accommodation space unobstructed opening and into the rearward battery accommodation space.

* * * * *